United States Patent [19]

Baines

[11] Patent Number: 4,893,043
[45] Date of Patent: Jan. 9, 1990

[54] BRUSH PROTECTION IN AN ELECTRIC MOTOR

[75] Inventor: Roger F. Baines, Repulse Bay, Hong Kong

[73] Assignee: Johnson Electric Industrial Manufactory Limited, Chaiwan, Hong Kong

[21] Appl. No.: 155,705

[22] Filed: Feb. 16, 1988

[30] Foreign Application Priority Data

Feb. 16, 1987 [GB] United Kingdom ............... 8703527

[51] Int. Cl.[4] .......................................... H02K 13/00
[52] U.S. Cl. ................................. 310/239; 310/42; 310/89; 310/242; 310/246
[58] Field of Search ............... 310/239, 240, 241, 242, 310/243, 244, 245, 246, 248, 89, 154, 229, 230, 42, 90; 318/361, 541, 542

[56] References Cited

U.S. PATENT DOCUMENTS 4,296,343 10/1981 McMillen ........................... 310/154
4,414,481 11/1983 de Jong ............................. 310/154
4,596,941 6/1986 Kluck ................................. 310/239

FOREIGN PATENT DOCUMENTS 2812214 9/1979 Fed. Rep. of Germany ...... 310/239
2262540 7/1983 Fed. Rep. of Germany ...... 310/239
3420713 12/1985 Fed. Rep. of Germany ...... 310/239
1073832 2/1984 U.S.S.R. ............................ 310/239
2094561 9/1982 United Kingdom ................ 310/242

Primary Examiner—R. Skudy
Attorney, Agent, or Firm—Fleit, Jacobson, Cohm, Price, Holman & Stern

[57] ABSTRACT

In an electric motor having a commutator, when a brush wears the associated brushleaf carrying the brush may snag in gap between commutator segments of the commutator, the rotating commutator dragging a bushleaf around into electrical contact with the other brushleaf. To prevent electrical contact being made directly, or via a common commutator segment, a stop is integrally formed with a holder carrying the brushleaves to limit the movement of the brushleaf.

4 Claims, 2 Drawing Sheets

BRUSH PROTECTION IN AN ELECTRIC MOTOR

INTRODUCTION

The present invention relates to brush gear for an electric motor and in particular to an arrangement for preventing shorting between brushleaves of the motor when the brushes have worn.

BACKGROUND TO THE INVENTION

Brush gear in small electric motors, in particular fractional horsepower permanent magnet direct current (PMDC) motors, typically comprises a carbon brush which is carried on an end of a resilient, electrically conducting arm—the brushleaf. The brushleaf is arranged to bias the brush against a commutator on the motor shaft. Typically the brush gear is mounted in an end cap which carries a bearing for the motor shaft and forms a structural part of the motor assembly.

As a brush wears down the supporting brushleaf moves closer to the commutator. There is a danger that the brushleaf may snag on the commutator, in particular that it may catch in between segments of the commutator, and be dragged around with the rotating commutator. This may result in the brush or brushleaf making electrical contact with the other brush or brushleaf, directly or via a common commutator segment. This shorting between the brushleaves can be very dangerous, leading to the risk of fire in some PMDC motor applications.

SUMMARY OF THE INVENTION

The present invention provides a PMDC motor having a commutator and a pair of brushleaves each carrying a brush, each leaf biassing its respective brush against the commutator to make electrical contact therewith, wherein means is provided to prevent electrical shorting between the brushleaves which may be caused by a brushleaf being caught by a commutator and dragged into electrical contact with the other brushleaf.

A stop may be provided to maintain at least a predetermined separation between the brushleaf and the commutator as the brush wears.

In a particularly preferred embodiment a stop is provided to prevent a brushleaf, dragged by the commutator, comming into electrical contact with the other brushleaf, directly or via a common commutator segment.

Commonly the brushleaves are mounted in an end cap of the motor. Preferably the stop is provided in the end cap, and preferably is integrally formed therewith.

Where a motor is to be used in a single direction of rotation, a stop associated with only one of the brushleaves may be sufficient depending on the relative orientation of the brushleaves to the commutator and its direction of rotation since a brushleaf may simply ride on the rotating commutator without risk of being caught up. However it is preferred that a stop be associated with each brushleaf. This is particularly useful for applications where the motor may be reversible or where a common end cap and brush/brushleaf assembly is used for motors rotating in each direction. A single stop may extend between the two brushleaves to be associated with both of them.

Other preferred features and advantages will be apparent from the following description and the accompanying claims.

DESCRIPTION OF THE PREFERRED EMBODIMENTS

Figure 1:
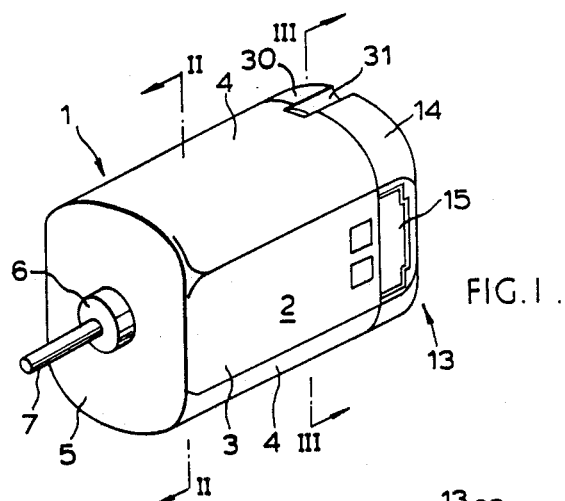
FIG. 1 shows a fractional horsepower PMDC motor embodying the invention.

FIG. 1 shows a fractional horsepower permanent magnet direct current motor 1 embodying the invention. The motor comprises a deep drawn can-like outer steel casing 2 having a pair of opposed planar side walls 3, opposed curved walls 4 and an integrally formed end wall 5. End wall 5 carries a bearing 6 in which an end of a motor shaft 7 is journalled. A plastics end cap 13, which may be moulded, for example, from nylon, carries a bearing at its centre to receive the opposite end of shaft 7.

Figures 2, 3:
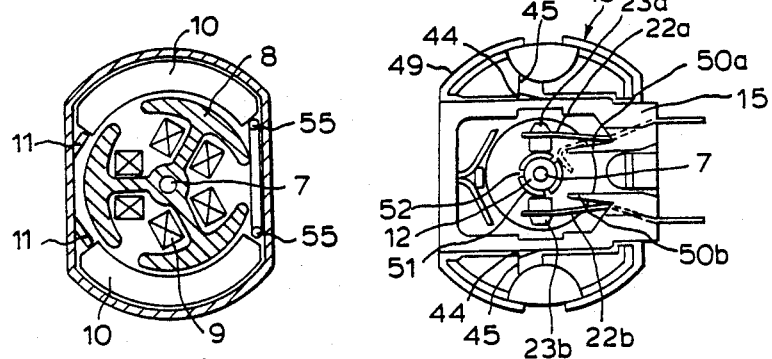
FIG. 2 is a cross-section along the line II—II of FIG. 1.
FIG. 3 is a plan view of the inside of an end of the motor of FIG. 1, looking generally on line III—III of FIG. 1.

Shaft 7 carries an armature 8 which, in the example shown, has three coils 9 wound about respective arms 8 (FIG. 2). A permanent magnet 10 is located inside each curved wall 4 between tangs 11 which are stamped in a side wall 3 and a U-shaped spring 55. Shaft 7 also carries a commutator 12 (FIG. 3) which is electrically connected to the coils of the armature.

End cap 13 comprises a bearing support portion 14 and a holder 15 for brush gear which allows the bearing support portion 14 to be attached to the casing 1 before the holder 15 with the brush gear is inserted in the motor. FIG. 3 shows a view of the inside of the end cap 13 with the holder 15 and brush gear in position.

Figure 4:
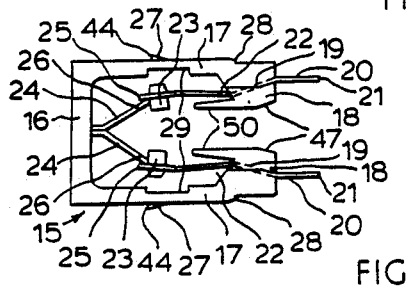
FIG. 4 is a plan view of a frame holding brushes for insertion into the electric motor of FIG. 1.
Figure 5:
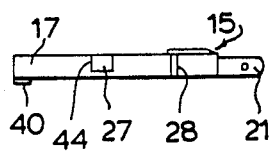
FIG. 5 is a side view of the holder of FIG. 1.

As seen in FIGS. 4 and 5, the holder 15 comprises a U-shaped plastics frame, moulded of nylon, having an end wall 16 arms 17. At the open end of the frame the ends 18 of the arms 17 are each enlarged and provided with a slot 19 for receiving a brush holder 20. Brush holder 20 comprises a tang portion 21 for connection to a power supply (not shown) and a resilient brushleaf 22 having a brush 23 mounted at its end. A manner of mounting such brushes 23 to brushleaves 22 is well known and described in the literature. The brush may comprise a portion of the brushleaf itself, usually with a surface coating, as is known in the art. The leaf 22 is riveted to an overlapping portion of the tang 21 and the rivetted portions are snugly received in the slots 19. Slots 19 extend deep into the end 18 of the arms 17 to allow the ends 18 to flex about the base of the slots to grip to brush holder 20 as the ends are squeezed.

In accordance with the invention, a stop 50 is integrally formed with each end 18, the stops 50 projecting within the holder generally parallel to the brushleaves 22.

A pair of resilient, curved tabs 24 extend out from the end wall 16, and the tips 25 of the brushleaves 22 are hooked behind ends 26 of the tabs. As will be described hereinafter, as holder 15 is slid into the bearing support portion 14, the ends 26 of the tabs 24 are urged back against the wall 16 to release the brushleaves, allowing them to spring back to place the brushes on the commutator 12 (FIG. 3).

A locking, wedge shaped formation 27 is formed on the outside of arms 17 which are also provided with a shoulder 28 for location of the frame 15 in the bearing support portion 14.

Recesses 29 allow the arms 17 to flex readily as the frame is slid home in the end cap and ensure that the brushes 23 do not foul the arms 17.

The brush holders 20 may be fitted in the frame simply by hooking the tips 25 behind the tabs 24 as shown and pushing the holders down into the slots 19 from above.

Figure 6:
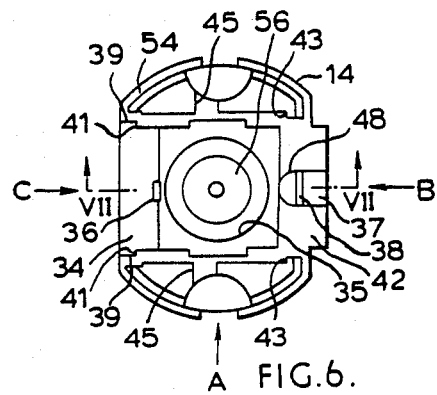
FIG. 6 is a plan view of the inside of a bearing support part of an end cap for an electric motor for receiving the brush holder of FIG. 4.
Figure 7:
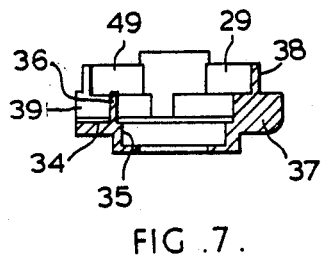
FIG. 7 is a cross-section along the line VII—VII of FIG. 6.

FIG. 6 is a plan view of the inside of the end cap. bearing support portion 14 (the holder 15 being removed). Support 14 cooperates with the casing 2 to form a channel for receiving the holder 15, the frame being a snug fit between the end of casing 2 and edges of the bearing support portion 14. Shoulders 28 and wedge formations 27 cooperate with the bearing support portion 14 to fix the holder 15 in position after it is slid home.

The bearing support portion 14 has curved side walls 49 (seen in FIG. 9) provided with a shoulder 54. The wall portions 29 above the shoulders 54 are received in the casing 2, shoulders 54 abutting against the end of the casing. Tangs 30 on the casing are swaged over to engage the base 32 of recesses 31 in the side walls 49 to hold the bearing support portion 14 on the casing 2.

A channel 33 is formed by the side walls 49 and a base 34 of the bearing support portion 14. Base 34 has a circular recess 35 which receives a bearing 56 for motor shaft 7.

Projecting up from the base 34 is a post 36 against which the centre portions of resilient tabs 24 of frame 15 will abut as the holder is slid home. The ends of tabs 24 will thus be urged backwards to release the brushleaves 22. A second post 37 is formed opposite post 36. The ends 18 of the holder 15 are received between post 37 and side walls 49. The gap between the post 37 and side walls 49 is arranged to squeeze slightly the ends 18 to ensure that the brush holders 22 are gripped in the slots 19. Post 37 carries a tongue 38 which fits inside and against a wall 3 of the casing 2.

Figure 10:
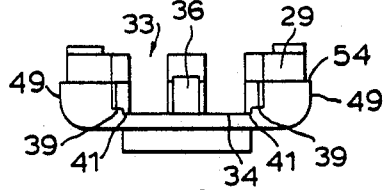
FIG. 10 is a side view or arrow C of FIG. 6.

A ledge 39 is formed at either side of the channel 33 opposite post 36 (FIG. 10). A protrusion 40 on the holder 15 (FIG. 5) sits between the ledges 39 as the holder 15 is slid home in the bearing support portion 14, the protrusion 40 abutting against shoulders 41. A ledge 42 is provided across the opening adjacent post 37 at the same height as ledge 39.

Figures 8, 9:
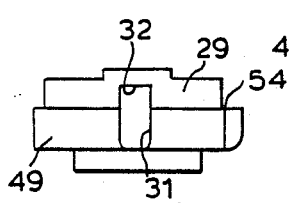
FIG. 8 is a side view of the cap of FIG. 6 on arrow A.
FIG. 9 is a side view on arrow B of FIG. 6.

To assemble the motor of FIG. 8, the rotor and stator assemblies are installed in the casing 2 as generally known, and then the bearing support portion 14 with bearing 56 in the bearing cup 35 is slid over shaft 7 and attached to the casing 2 by tangs 30.

The holder 15 carrying the brusholders and brushes 23 is then slid into the opening formed between the bearing support portion 14 and casing on the side of post 36 (the direction of arrow C). The face of the holder 15 as seen in FIG. 1 will face the channel 33 of the bearing support portion 14.

As the holder is slid home the protrusion 40 abuts shoulders 41, and the shoulders 28 abut shoulders 43 on the end cap.

The wedge shape formations 27 slide over the inside surfaces of the side walls 49 causing arms 17 to flex inwardly, and the vertical faces 44 of the formation 27 will lock in recesses 45 in the walls 49, as seen in FIG. 3.

Also as the holder is slid home, post 36 bears against tabs 24 to release the brushleaves 22 and so the brushes 23 to bear on the commutator 12.

The holder 15 is therefore held securely against further sliding movement and the brush holders 20 are held in the slots 19 between the holder and the end cap. The inside faces 47 of the ends 18 are chamfered to ride over the curved face 48 of post 37, the ends 18 being gently squeezed.

The improvement of the present invention lies in the provision of the stops 50 which prevent a brushleaf 22 being dragged around by the commutator to a position where it may make electrical contact with the other brushleaf directly, through a brush and/or through a common commutator segment. In the embodiment shown, having three coils 9, each commutator segment 51 extends for just under 120 degreees around the circumference of the commutator (FIG. 3).

Referring to FIG. 3, if the motor is rotating clockwise as viewed in the drawing there is a danger that as brush 23a wears, the brushleaf 22a may be snagged by the gaps 52 between the segments 51 and dragged around by the commutator towards the other brushleaf 22b. The stop 50a will limit the movement of the brushleaf 22a, causing it to bend around the stop 50a, so that it will not reach the other leaf 22b, or contact with the commutator 12 at a point less than 120 degrees away from the point of contact of the other brush or brushleaf 23b, 22b, as shown in dotted lines in FIG. 3.

Figure 11:
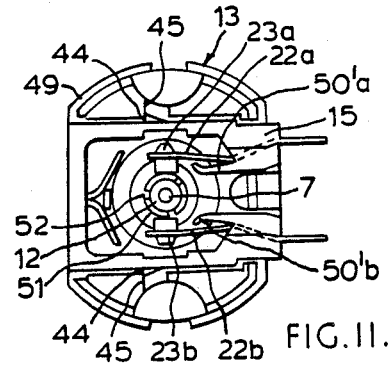
FIG. 11 shows a modification of the embodiment of FIGS. 1 to 10, and corresponds to FIG. 3.

In FIG. 11, there is shown a modification of the embodiment of FIGS. 1 to 10. FIG. 11 corresponds to FIG. 3 and like parts are given like reference numerals. In this modification, the stops 50'a and 50'b are shaped to prevent a respective brushleaf 22a, 22b contacting the commutator 12 when the brush wears.

Various modifications may be made to the described embodiment and it is desired to include all such modifications as fall within the scope of the accompanying claims.

What is claimed is:

1. A PMDC motor having a commutator and a pair of brushleaves each carrying a brush, each leaf biassing its respective brush against the commutator to make electrical contact therewith, wherein an abutment-type stop is provided for at least one of the brushleaves the stop being located to engage said one of the brushleaves so as to limit movement of said one of the brushleaves toward the commutator and prevent electrical shorting between the brushleaves wherein the motor includes an end cap, wherein the end cap comprises a bearing support portion and a holder slidably received in the bearing support portion, the brushleaves being mounted in the holder and wherein the stop is integrally formed on the holder.

2. A motor as claimed in claim 1, wherein the stop is located to prevent said one of the brushleaves approaching the commutator closer than a predetermined distance of separation as the brush wears.

3. A motor as claimed in claim 1, wherein the stop is located to prevent the respective brushleaf being brought into electrical contact with another of the brushleaf via a segment of the commutator.

4. A motor as claimed in claim 1, wherein the brushleaves are mounted substantially as mirror images and the stop is replicated for each brushleaf to prevent one of the brushleaves being dragged into direct electrical contact with the other of the brushleaves and via a common commutator segment.

* * * * *